United States Patent
Unnerstall et al.

(10) Patent No.: US 11,087,539 B2
(45) Date of Patent: Aug. 10, 2021

(54) SYSTEMS AND METHODS FOR GENERATING AUGMENTED REALITY-BASED PROFILES

(71) Applicant: MASTERCARD INTERNATIONAL INCORPORATED, Purchase, NY (US)

(72) Inventors: Rick Unnerstall, O'Fallon, MO (US); Ping X Chen, Chesterfield, MO (US); Brian Williams, St. Peters, MO (US); Emily Marie Thompson, St. Peters, MO (US); Ke Zhou, Chesterfield, MO (US); Zhenni Hu, St. Charles, MO (US); Christopher Eric Mullen, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/107,205

(22) Filed: Aug. 21, 2018

(65) Prior Publication Data

US 2020/0066040 A1    Feb. 27, 2020

(51) Int. Cl.
*G06T 19/00* (2011.01)
*G06F 3/01* (2006.01)
*G06Q 20/10* (2012.01)
*G06Q 20/38* (2012.01)
*G06K 9/00* (2006.01)
*G06Q 50/00* (2012.01)

(52) U.S. Cl.
CPC ............. *G06T 19/006* (2013.01); *G06F 3/011* (2013.01); *G06K 9/00671* (2013.01); *G06Q 20/102* (2013.01); *G06Q 20/3821* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,743,145 B1 * | 6/2014 | Price | G06F 16/954 345/633 |
| 8,965,460 B1 | 2/2015 | Rao et al. | |
| 9,007,473 B1 | 4/2015 | Worley, III et al. | |
| 2009/0237328 A1 | 9/2009 | Gyorfi et al. | |
| 2010/0257252 A1 | 10/2010 | Dougherty et al. | |

(Continued)

*Primary Examiner* — Hilina K Demeter
(74) *Attorney, Agent, or Firm* — Armstrong Teasdale LLP

(57) ABSTRACT

An augmented reality (AR) system for generating AR-based profiles using an AR computing device and an AR display device is provided. The AR system is configured to detect a consumer computing device located at a predefined distance from the AR display device, and transmit an electronic request message to an electronic computer application stored on the consumer computing device. The AR system is also configured to receive an electronic response message from the consumer computing device, wherein the electronic response message includes AR consumer data, and retrieve, from a database, an AR-based profile associated with the consumer based on the AR consumer identifier. The AR system is further configured to transmit the AR-based profile in the form of AR data to the AR display device, and display the AR data on a display screen of the AR display device.

25 Claims, 7 Drawing Sheets

(56) References Cited

U.S. PATENT DOCUMENTS

| | | |
|---|---|---|
| 2013/0293580 A1 | 11/2013 | Spivack |
| 2013/0342564 A1 | 12/2013 | Kinnebrew et al. |
| 2014/0100997 A1* | 4/2014 | Mayerle ............ G06Q 30/0276 |
| | | 705/27.2 |
| 2015/0029222 A1* | 1/2015 | Hofmann ............ G06K 9/6202 |
| | | 345/633 |
| 2015/0073907 A1* | 3/2015 | Purves .................. G06Q 20/32 |
| | | 705/14.58 |
| 2015/0206329 A1 | 7/2015 | Devries et al. |
| 2016/0098860 A1 | 4/2016 | Basra et al. |
| 2016/0109954 A1* | 4/2016 | Harris .................... G06F 3/011 |
| | | 345/156 |
| 2017/0039770 A1 | 2/2017 | Lanier et al. |
| 2018/0253900 A1* | 9/2018 | Finding ................ G02B 27/017 |
| 2018/0284453 A1* | 10/2018 | Irvin .................. G02B 27/0172 |
| 2018/0365893 A1* | 12/2018 | Mullins ............. G02B 27/0172 |
| 2019/0130655 A1* | 5/2019 | Gupta ................ H04N 21/4126 |

* cited by examiner

SYSTEMS AND METHODS FOR GENERATING AUGMENTED REALITY-BASED PROFILES

BACKGROUND

This disclosure relates generally to augmented reality systems and, more specifically, to systems and methods for generating augmented reality-based profiles.

The term "augmented reality" (AR) generally refers to a view of a physical, real-world environment of a viewer where certain elements in the view (or AR view) are augmented by computer-generated sensory input, such as sound, video, or graphics data. The computer-generated (CG) elements may be purely computer-generated or generated using a real-world object that is in the viewer's physical environment or is remotely located from the viewer. Within the view, the CG elements appear to be superimposed onto the viewer's physical environment to create an augmented reality as distinct from the viewer's physical reality. In some implementations, the viewer will use an AR display device to see the AR view. AR display devices may include glasses, goggles, head-up displays (e.g., on a car windshield), or the like. Additionally, a viewer will often have one or more optical instruments, such as cameras, for recording or capturing images of the viewer and the viewer's environment. These cameras may be used to record the viewer's movements for later viewing or transmission as well.

Some known systems' use of AR is quite limited. For example, some known AR-using systems are limited or unable in their ability to present CG elements that are specifically tailored to the viewer. Some other known AR-using systems are unable to present CG elements that can be used by the viewer for a specific purpose (e.g., to mimic the CG element or to gain usable information from the CG elements). Some other known AR-using systems are unable to present continuously updated data from a remote source, such as a remote server, a remote computing device, and/or other remote devices. For example, these known AR systems can only display preset CG elements and cannot update the CG elements in response to, for example, a remote object or person that is associated with the generated CG element(s). Other known AR-using systems do not enable the viewer to interact with the CG element, leading to a less engaging experience. For example, these known systems do not enable the viewer to interact with a CG element where the CG element updates its appearance or causes an update to the view in the viewer's AR display device.

In addition to AR systems, there are also computer systems that are virtual reality (VR) based computer systems. VR-based systems are different from AR systems in that the user's view is entirely computer-generated. VR-based systems may cause safety concerns in certain activities (such as retail customer service) where the total immersion in a virtual reality environment may decrease situational awareness and cause injury.

BRIEF DESCRIPTION

In one aspect, an augmented reality (AR) system for generating AR-based profiles using at least one AR computing device and at least one AR display device operated by a user is provided. The AR system is configured to detect, using at least one network connection via the AR display device, a consumer computing device located at a predefined distance from the AR display device. The AR system is also configured to transmit, via the AR display device, an electronic request message to an electronic computer application stored on the consumer computing device, the electronic request message including a request to confirm that a consumer associated with the consumer computing device is registered in a consumer profile (CP) service. The AR system is further configured to receive, by the AR computing device via the AR display device, an electronic response message from the consumer computing device, wherein the electronic response message includes AR consumer data including an AR consumer identifier, and wherein the electronic response message is received in response to the electronic request message. The AR system is also configured to retrieve, by the AR computing device from a database, an AR-based profile associated with the consumer based on the AR consumer identifier, transmit, to the AR display device, the AR-based profile in the form of AR data, and display, by the AR display device, the AR data on a display screen of the AR display device.

In another aspect, a computer-implemented method for generating augmented reality (AR)-based profiles using an augmented reality (AR) system including at least one AR computing device and at least one AR display device operated by a user is provided. The method includes detecting, using at least one network connection via the AR display device, a consumer computing device located at a predefined distance from the AR display device. The method also includes transmitting, via the AR display device, an electronic request message to an electronic computer application stored on the consumer computing device, the electronic request message including a request to confirm that a consumer associated with the consumer computing device is registered in a consumer profile (CP) service. The method further includes receiving, by the AR computing device via the AR display device, an electronic response message from the consumer computing device, wherein the electronic response message includes AR consumer data including an AR consumer identifier, and wherein the electronic response message is received in response to the electronic request message. The method also includes retrieving, by the AR computing device from a database, an AR-based profile associated with the consumer based on the AR consumer identifier, transmitting, to the AR display device, the AR-based profile in the form of AR data, and displaying, by the AR display device, the AR data on a display screen of the AR display device.

In yet another aspect, a non-transitory computer readable medium that includes computer-executable instructions for generating augmented reality (AR)-based profiles using an augmented reality (AR) system including at least one AR computing device and at least one AR display device operated by a user is provided. When the computer-executable instruction are executed by the AR system, the computer-executable instructions cause the AR system to detect, using at least one network connection via the AR display device, a consumer computing device located at a predefined distance from the AR display device. The computer-executable instructions also cause the AR system to transmit, via the AR display device, an electronic request message to an electronic computer application stored on the consumer computing device, the electronic request message including a request to confirm that a consumer associated with the consumer computing device is registered in a consumer profile (CP) service. The computer-executable instructions further cause the AR system to receive, by the AR computing device via the AR display device, an electronic response message from the consumer computing device, wherein the electronic response message includes AR consumer data including an AR consumer identifier, and wherein the electronic response message is received in response to the electronic request message. The computer-executable instructions also cause the AR system to retrieve, by the AR computing device from a database, an AR-based profile associated with the consumer based on the AR consumer identifier, transmit, to the AR display device, the AR-based profile in the form of AR data, and display, by the AR display device, the AR data on a display screen of the AR display device

BRIEF DESCRIPTION OF THE DRAWINGS

FIG. 1 is a simplified block diagram of an example augmented reality (AR) system, in which a variety of computing devices are communicatively coupled to each other via a plurality of network connections.

FIG. 2 illustrates an example display of augmented reality (AR)-based profiles using an AR display device included in the AR system shown in FIG. 1.

FIG. 3 is an example configuration of a database used by the AR system shown in FIG. 1 for generating AR-based profiles.

FIG. 4 illustrates an example configuration of the AR display shown in FIG. 2.

FIG. 5 illustrates an example configuration of an AR computing device included in the AR system shown in FIG. 1.

FIG. 6 is an example method for generating AR-based profiles using the AR system shown in FIG. 1.

FIG. 7 illustrates an example configuration of a database within a computing device, along with other related computer components, that may be used to generate and display computer-generated (CG) elements using AR data.

Like numbers in the Figures indicate the same or functionally similar components.

DETAILED DESCRIPTION

Figure 1:
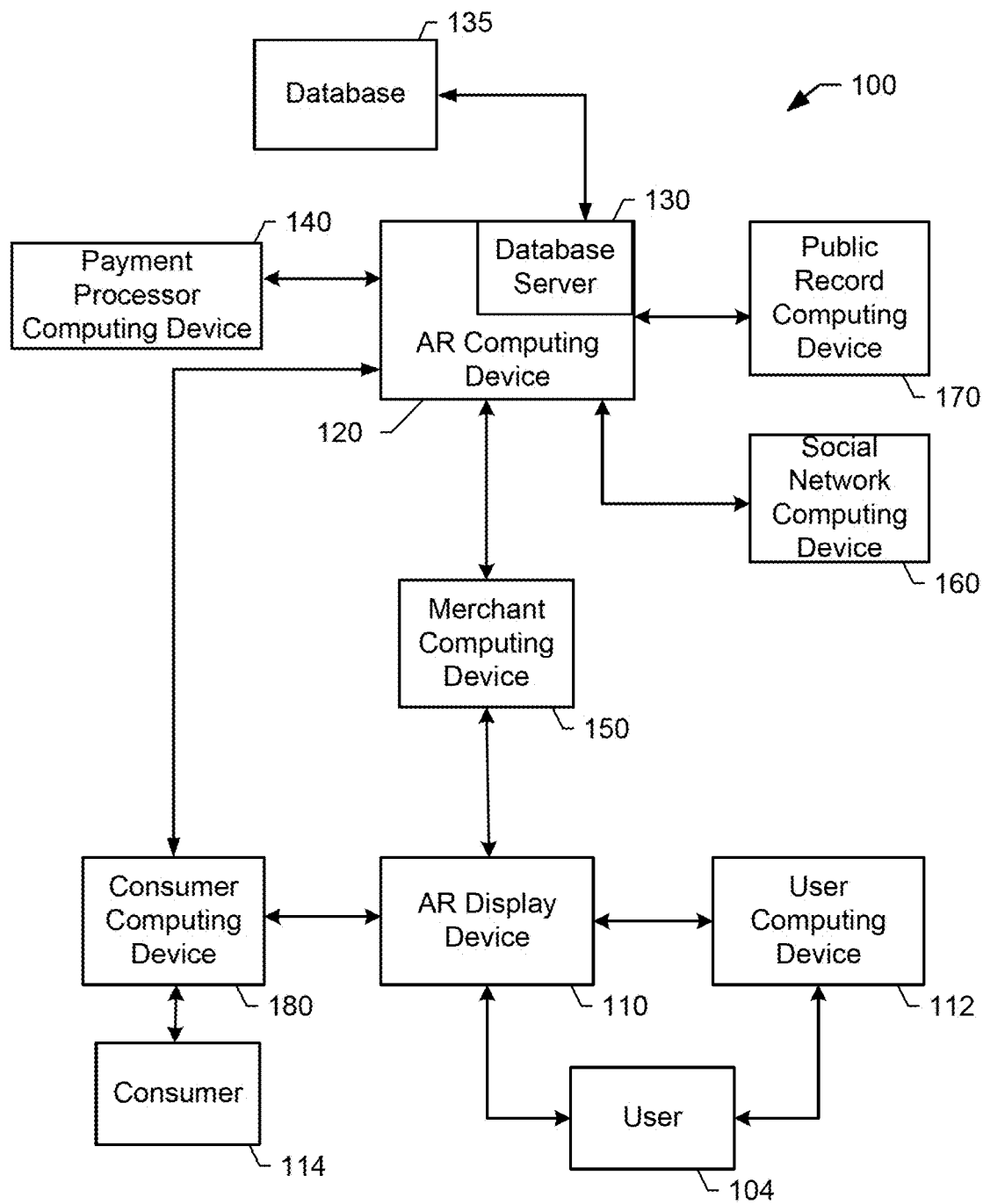
FIGS. 1-7 show example embodiments of the methods and systems described herein.

The systems and methods described herein relate generally to generation and display of profiles (e.g., consumer profiles) using an augmented reality (AR) system. More specifically, the systems and methods described herein include an augmented reality (AR) computing device in communication with an augmented reality (AR) display device, either directly or indirectly, via at least one merchant computing device. The AR computing device provides a consumer profile (CP) service to users (e.g., merchants or viewers) by generating augmented reality (AR)-based profiles that are displayed by the AR display device. The AR display device enables users to view the augmented reality-based profiles in the form of certain computer-generated (CG) elements superimposed onto the viewer's view of the physical environment. An overview of example embodiments is provided herein. The following paragraphs use the example of retail merchants to illustrate the example embodiments disclosed herein. Although much of this description relates to the use of the AR systems in the context of retail merchants, it should be understood that the systems and methods described herein are not limited to such a use only. The systems and methods described herein could be used in many other applications as well where profiles of people or entities may be needed.

The AR system may be implemented for a variety of service activities. Such activities may include car rental services, day care services, physical therapy services, physical training services, hospitality services, or any other service where a service provider interacts face-to-face with customers in real-time. For example, one such service may be at a merchant retail store. In the example embodiment, the AR system is implemented in the retail industry (e.g., brick-and-mortar retail stores) and includes an AR computing device that is in communication with multiple data sources. Such data sources may include at least one AR display device, a payment processor computing device, at least one public record computing device, at least one social network computing device associated with social networks (e.g., FACEBOOK®, INSTAGRAM®, SNAPCHAT®, GOOGLE™ or other type of social network), at least one merchant computing device, at least one consumer computing device, and/or any other suitable devices that enable the AR computing device to function as described herein.

In the example embodiment, the AR computing device is configured to receive data from the multiple data sources, generate (e.g., build) AR-based profiles for each person or consumer based on the received data, generate AR data using the AR-based profiles, transmit the AR data to an AR display device in real time, and instruct or cause the AR display device to display the AR data to a user wearing the AR display device while the user is performing an activity. As defined herein, real-time relates to the onboarding system processing data within a short period of time (e.g., from about milliseconds to minutes, or hours, as opposed to a matter of days) so that the data output and/or input is available virtually immediately. The AR computing device is also configured to store one or more of the received data within a database in communication with the AR computing device.

The AR computing device may receive data such as consumer data (e.g., registration consumer data and/or AR consumer data) from a consumer computing device, public record data from a public record computing device, transaction data from a payment processor computing device, social network data from a social network computing device, merchant data from a merchant computing device, and/or other data that enables the AR computing device to function as described herein.

The consumer data may include a consumer identifier (e.g., registration consumer identifier and/or AR consumer identifier), a consumer computing device identifier, an authentication criteria (e.g., a personal identification number (PIN) or biometric authentication), a username, a consumer name, a consumer address, a consumer phone number, a consumer date of birth, a consumer email address, a time and date of registration, an opt-in option, and/or other data associated with a consumer. The consumer data may be received by the AR computing device from a consumer computing device as part of a consumer registration process in the CP service (e.g., registration consumer data), via the AR display device at the time the AR display device detects the consumer computing device (e.g., AR consumer data), and/or at any other time that the AR system may require the consumer data to function as described herein.

The public record data may include public records available to the public, such as public offenses committed by consumers. More specifically, the public record data may include an individual identifier, a type of offense, a time and date of offense, a place of offense, and/or other associated with public records.

The transaction data may include payment transactions initiated by a consumer using a payment device (e.g., a payment card, digital wallet, mobile payment, etc.) associated with a particular transaction processing network. The transaction data may also include data associated with the consumer and a merchant involved in a payment transaction. For example, transaction data may include one or more of: a consumer account data (e.g., a primary account number (PAN)), a consumer biometric data, a merchant identifier, a merchant computing device identifier, a transaction amount, a time and date of the transaction, data descriptive of a purchase, a location of the transaction, an authorization message, and/or other data associated with the payment transaction. The social network data may include a social network identifier, a social network name (e.g., FACEBOOK®, INSTAGRAM®, SNAPCHAT®, or other social network names), a user identifier, a user name, a number of followers and/or friends of the consumer, liked pages, marketplace data, and/or other social network data associated with the consumer social network interaction. The merchant data includes data associated with the merchant. The merchant data may include a merchant identifier, a merchant name, a merchant location, merchant loyalty program data, merchant transaction data (e.g., similar to transaction data received from the payment processor computing device, but only for a particular merchant), and/or other data associated with the merchant.

In the example embodiment, the AR computing device registers a consumer into the CP service by receiving and processing consumer data received from a consumer computing device associated with the consumer. The consumer data may be received in the form of an electronic message. At the time of registration, the AR computing device instructs or causes the consumer computing device to display a message requesting the consumer to opt-in to the CP service. The consumer may opt-in to provide all or partial data to the AR computing device. In cases where the consumer opts-in to provide partial data, the AR computing device does not receive the data that the consumer did not opt-in to provide. Additionally or alternatively, the AR computing may receive the data that the consumer did not opt-in, but the data is anonymized or the AR computing anonymizes it. That is, the data may be anonymized and aggregated (e.g., by the data sources where the AR computing devices collect the data from) prior to receipt by the AR computing device (i.e., no personally identifiable information (PII) is received by the AR computing device), or the AR computing device may be configured to receive the data that is not yet anonymized and/or aggregated, and thus may be configured to anonymize and aggregate the data. Any PII received by the AR computing device is received and processed in an encrypted format, or is received with the consent of individuals with which the PII is associated. In situations in which the systems discussed herein collect personal information about individuals including consumers and/or merchants, or may make use of such personal information, individuals may be provided with an opportunity to control whether such information is collected or to control whether and/or how such information is used. In addition, certain data may be processed in one or more ways before it is stored or used, so that personally identifiable information is removed.

Once the consumer is registered, the AR computing device stores the consumer data within the database. The AR computing device is configured to use one or more data points from the consumer data to perform lookups in multiple data sources for data associated with the registered consumer. For example, the AR computing device may use the registration consumer identifier included in the registration consumer data to perform a look up in a social network computing device for data associated with the registered consumer, such as the registered consumer social network page which may include data corresponding to the number of friends and/or followers within the social network.

The AR computing device is also configured to collect and receive data associated with the registered consumer from the multiple data sources. Once the AR computing device receives the data from the multiple data sources, the AR computing device is configured to store the received data in tables within the database and generate, based on the stored, data, an AR-based profile for the registered consumer. In the example embodiment, the AR computing device generates the AR-based profile and continuously updates the profile by parsing the multiple data sources, collecting, from multiple data sources, updated data associated with the registered consumer, and updating the tables within the database.

In the example embodiment, when a registered consumer in the CP service visits a merchant (e.g., a physical location of the merchant) using the CP service, an employee of the merchant equipped with an AR display device (e.g., a user of the AR display device) or otherwise holding the AR display device may view the consumer through the AR display device, which may detect consumers as registered or non-registered consumers. In some embodiments, the user may be any individual who utilizes the AR display device. The AR display device is configured to detect registered and non-registered consumer computing devices located at a predefined distance from the AR display device. Upon detection of the consumer as a registered consumer or the consumer computing device as a registered consumer computing device, the AR display device may receive from the AR computing device AR data associated with the registered consumer along with instructions to display the AR data on the AR display device. The AR display device is configured to display the AR data to the user as an overlay over the natural surroundings of the user. Thus, the user is able to see the AR data being displayed while still viewing consumers (e.g., registered and non-registered consumers), aisles, shelves, and other items included within the user's surroundings along with the movement of all such items. The AR display device is also configured to display the AR data by superimposing such data either on top, above, or near the registered consumer on the see-through display. The AR display device is further configured to display the AR data in the form of computer-generated (CG) elements. The AR data may include consumer spend history data, consumer product return data, public record data, social network data, customer service data, hot zone data, online cart shopping data, image data, or any other data that may be suitable to be displayed on the see-through display of the AR display device. In some embodiments, the AR data may also include real-time data transmitted from the AR computing device, a server, user input data, and/or data stored in the AR system.

The consumer spend history data may include a description of items a consumer has bought at the merchant and/or other merchants, an amount spent by the consumer for each item bought and/or a total amount spent for a period of time, time when items were bought by the consumer, a quantity of items bought by the consumer, a historical spend pattern (e.g., historical pattern corresponding to types of items bought by the consumer, currency amount(s) spent by the consumer, dates and times when the consumer purchased the items, and other historical spend data that may have a pattern), and other types of consumer spend history data associated with purchases performed by the consumer. The consumer product return data may include a product return ratio, a description of returned items by the consumer, an amount of items returned by the consumer, a pattern of types of items returned by the consumer, day/time when items were returned by the consumer, a historical pattern of items returned by the consumer (e.g., historical pattern corresponding to types of items retuned by the consumer, current amount(s) returned by the consumer, dates and times when the consumer returned the items, and other historical product return data that may have a pattern), and other types of consumer product return data associated with purchases performed by the consumer.

The customer service data may include a flag that indicates whether the consumer has been helped, historical customer support data (e.g., how many times the consumer has been help, dates and times the consumer was helped, consumer inquiries each time he or she was helped, answers to the consumer inquiries, satisfaction of the consumer for each time he or she was helped, consumer satisfaction pattern, whether each consumer inquiry was resolved, and other historical customer support data associated with events when the consumer was helped), sales conversion rates when the consumer was helped, and other customer service data associated with the customer service provided to the consumer. The hot zone data may include one or more CG elements in the form of icons (e.g., flag, shape, geometric shape, image, or the like) indicating that the consumer is moving towards or is in an area of the merchant's location where the consumer has purchased items before (e.g., a clothing section, shoes section, hardware section, or the like). The online cart shopping data may include items and their quantities placed by the consumer in an online shopping cart of the merchant that the consumer is physically now visiting. The image data may include pictures and/or videos taken by a security system in communication with the AR computing device and/or the AR display device, wherein the pictures and/or videos are of locations outside or inside the merchant location.

In the example embodiment, the AR display device is configured to place the CG elements in positions within the see-through display that enable the user to identify that these CG elements correspond to a registered consumer and not to a non-registered consumer. Therefore, The AR display device does not superimpose the AR data either on top, above, or near of the non-registered consumers on the see-through display. However, infrared technology embedded in the AR display device, for example, may detect the non-registered consumers and corresponding consumer computing devices (e.g., mobile devices). Once The AR display device has detected the non-registered consumers and corresponding non-registered consumer computing devices, the AR display device may transmit a message to said computing devices using a similar method that the AR display device uses to transmit messages to consumer computing devices associated with registered consumers as described herein. The message sent to the non-registered consumer computing devices may include a merchant identifier and addendum data. The addendum data may include information related to the merchant, such as incentives (e.g., discounts) for the consumer to download an application associated with the merchant and the CP service. Thus, the non-registered consumers can even more easily become registered consumers.

In some embodiments, the AR system may include other computing devices and/or systems in communication with the AR display device, either directly or indirectly, via the at least one merchant computing device and/or the AR computing device. The AR display device may be in communication with computing devices and/or systems via network connections, such as the Internet, LAN/WAN, BLUETOOTH™, Wi-Fi, or other connections capable of transmitting data across computing devices. Such computing devices and/or systems may include a point-of-sale (POS) system, a security system, an entertainment system, or any other suitable devices that enable the AR system to function as described herein. The AR display device may also be in communication with other systems, directly or indirectly, via the at least one merchant computing device and/or the AR computing device, such systems may be public record computing devices, social network computing devices, or any other suitable devices that enable the AR system to function as described herein. The AR display device may also be in communication with at least one consumer computing device via the network connections described above. These network connections enable the AR display device to detect the at least one consumer computing device located at a predefined distance from the AR display device. Once the AR display device detects the at least one consumer computing device, the AR display device establishes a connection or link with the consumer computing device and sends an electronic message (e.g., ping) to an electronic computer application stored on the at least one consumer computing device, where the electronic computer application is associated with the CP service. The message includes a request to confirm that the at least one consumer computing device, and more specifically the consumer, is registered in the CP service. If the electronic computer application stored on the at least one consumer computing device returns to the AR display device an electronic message including a confirmation of registration and data associated with the consumer (e.g., AR consumer data), the AR display device transmits the data associated with the consumer to the AR computing device, which in response transmits the AR data associated with the consumer to the AR display device for the user to view.

In the example embodiment, the AR display device includes a see-through, near-eye, mixed reality display device (e.g., HOLOLENS™ by Microsoft, GLASS™ by Google). The AR display device may be a pair of goggles, a pair of glasses, one or more contact lenses, a handheld device or screen, a fixed screen (such as a vehicle windshield or other surface), or the like. More generally, the AR display device may be any surface or screen that a viewer may look at to see the viewer's physical environment but that also enables the viewer to view certain CG elements superimposed onto the viewer's view of the physical environment. These CG elements may appear two-dimensional or three-dimensional. As an example, the CG elements may be a three-dimensional (3D) rendering. In the example embodiment, the AR computing device generates these CG elements and transmits them to the AR display device for the viewer to view. The AR display device may also include embedded or communicatively coupled input/output devices to enable the viewer to interact with the AR display device. For example, the AR display device may have a camera device embedded or attached, enabling the AR display device to capture and record images directly. The camera device may also enable infrared technology to detect (e.g., recognize) consumers. As another example, the AR display device may also include a microphone to receive voice commands, a speaker to transmit audio outputs, or the like. In a related embodiment, the AR display device may also be an AR computing device. That is, the AR display device may generate some or all CG elements itself as well and/or the AR-based profiles.

In some embodiments, the AR display device is configured to receive data from a user of the AR display device via a user computing device, a POS device, and/or user eye movement, hand gestures (e.g., tapping swiping, or input commands for the AR display device that are virtually displayed by the AR display device), or other input modes detected by the AR display device. In one embodiment, the user computing device is used by a user (e.g., a merchant employee) equipped with the AR display device. The user may input data, such as user input data, into the user computing device which transmits the user input data to the AR display device. The AR display device may transmit the user input data to the AR computing device, directly or indirectly, via the merchant computing device. The AR computing device may store the user input data within a database in communication with the AR computing device. Additionally or alternatively, the merchant computing device and/or the AR computing device may be configured to transmit the user input data to other AR display devices in communication with the merchant computing device and/or the AR computing device, so that these AR display devices may display a CG element in the form of an icon (e.g., flag, shape, geometric shape, image, or the like) indicating, for example, that a consumer has already been helped. The user input data may include whether customer support was provided to the consumer, the type of customer support provided to the consumer (e.g., the inquiry of the consumer and answer of the retail employee to the consumer inquiry), the satisfaction of the consumer with the customer support, or the like.

In some embodiments, the AR display device is configured to record and analyze verbal interactions. The AR display device is further configured to determine the type of verbal interaction that was recorded and automatically transmit the recorded verbal interaction to the AR computing device, directly or indirectly, via the merchant computing device. The merchant computing device and/or the AR computing device may transmit the recorded verbal interaction to another AR display device (e.g., an AR display device used by a manager of the merchant employee). For example, a user equipped with the AR display device, such as an employee, may have a conversation with a consumer. During the conversation, the AR display device may record and analyze the conversation. By performing an analysis of the conversation, the AR display device may determine that the conversation involves a consumer complaint and, based on such determination, the AR display device automatically transmits the conversation, in the form of a message, directly to a manager's AR display device. This could also be done via the merchant computing device and/or the AR computing device.

In yet other embodiments, the AR computing device is configured to receive and store recordings, such as videos and/or audios, captured by the AR display device. The recordings may include interactions between the user equipped with the AR display device and one or more consumers. The recordings may also include interactions between the user equipped with the AR display device and any other person that the user may interact with (e.g., other employees, managers, or the like). The stored recordings may be used for later review. For example, the recordings may be used for training, service improvement, potential payment dispute settlements (e.g., consumers and/or suppliers payment dispute settlements), or any other suitable use the users of the AR computing device may find.

The methods and system described herein may be implemented using computer programming or engineering techniques including computer software, firmware, hardware, or any combination or subset. As disclosed above, at least one technical problem with prior systems is they are unable to use AR's various capabilities to improve customer service while performing a service activity. There is a need to enhance the customer service awareness of a retail staff, and consequently provide a more seamless dining experience for consumers. The systems and methods described herein address that technical problem. The technical effect of the systems and processes described herein is achieved by performing at least one of the following steps: (a) detecting, using at least one network connection via the AR display device, a consumer computing device located at a predefined distance from the AR display device; (b) transmitting, via the AR display device, an electronic request message to an electronic computer application stored on the consumer computing device, the electronic request message including a request to confirm that a consumer associated with the consumer computing device is registered in a consumer profile (CP) service; (c) receiving, by the AR computing device via the AR display device, an electronic response message from the consumer computing device, wherein the electronic response message includes AR consumer data including an AR consumer identifier, and wherein the electronic response message is received in response to the electronic request message; (d) retrieving, by the AR computing device from the database, an AR-based profile associated with the consumer based on the AR consumer identifier; (e) transmitting, to the AR display device, the AR-based profile in the form of AR data; and (f) displaying, by the AR display device, the AR data on a display screen of the AR display device.

In one embodiment, a computer program is provided, and the program is embodied on a computer-readable medium. In an example embodiment, the system is executed on a single computer system, without requiring a connection to a service provider computing device computer. In a further example embodiment, the system is being run in a Windows® environment (Windows is a registered trademark of Microsoft Corporation, Redmond, Wash.). In yet another embodiment, the system is run on a mainframe environment and a UNIX® service provider computing device environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Service provider computing device, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

FIG. 1 is a simplified block diagram of an example augmented reality (AR) system 100, in which a variety of computing devices are communicatively coupled to each other via a plurality of network connections. These network connections may be Internet, LAN/WAN, BLUETOOTH™, Wi-Fi, or other connections capable of transmitting data across computing devices. AR system 100 includes augmented reality (AR) display device 110, augmented reality (AR) computing device 120, and database 135. In one embodiment, AR display device 110 and database 135 are components of AR computing device 120. AR computing device 120 may be a service provider computing device, a network of multiple computer devices, a virtual computing device, or the like. In the example embodiment, AR computing device 120 provides a consumer profile (CP) service to user 112 by generating AR-based profiles of consumers that are displayed by AR display device 110. AR display device 110 enables user 104 to view the AR-based profiles in the form of certain computer-generated (CG) elements superimposed onto user's 104 view of the physical environment. In the example embodiment, AR computing device 120 generates these CG elements and transmits them to AR display device 110 for user 104 to view. AR computing device 120 is connected to at least one payment processor computing device 140. AR computing device 120 may be in communication with other systems and/or computing devices. In the example embodiment, AR computing device 120 is in communication with merchant computing device 150, social network computing device 160, and public record computing device 170. In the example embodiment, AR computing device 120 receives and transmits data to AR display device 110, merchant computing device 150, social network computing device 160, and public record computing device 170.

Database server 130 is connected to database 135, which contains information on a variety of matters, as described below in greater detail. In one embodiment, database 135 is stored on AR computing device 120 and can be accessed by potential users of AR computing device 120. In an alternative embodiment, database 135 is stored remotely from AR computing device 120 and may be non-centralized. Database 135 may include a single database having separated sections, partitions, or tables, or may include multiple databases, each being separate from each other. Database 135 is in communication with AR display device 110 via AR computing device 120 and may store data associated with consumer 114.

In the example embodiment, AR computing device 120 is configured to receive data from the multiple data sources, such AR display device 110, payment processor computing device 140, at least one public record computing device 170, at least one social network computing device 160, at least one merchant computing device 150, at least one consumer computing device 180, and/or any other suitable devices that enable the AR computing device to function as described herein. The AR computing device 120 is also configured to generate (e.g., build) AR-based profiles for potential consumers based on the received data, generate AR data using the AR-based profiles, transmit the AR data to AR display device 110, and instruct AR display device 110 to display the AR data to user 104 while user 104 is performing an activity. The AR computing device is also configured to store one or more of the received data within database 135.

AR computing device 120 may receive data such as consumer data from consumer computing device 180, public record data from public record computing device 170, transaction data from payment processor computing device 140, social network data from social network computing device 160, merchant data from merchant computing device 150, and/or other data that enables AR computing device 120 function as described herein.

In the example embodiment, AR computing device 120 registers consumer 114 into the CP service by receiving and processing consumer data (e.g., registration consumer data) received from consumer computing device 180 associated with consumer 114. The consumer data may be received in the form of an electronic message (e.g., electronic registration message). Once consumer 114 is registered, AR computing device 120 stores the consumer data within database 135. AR computing device 120 is configured to use one or more data points from the consumer data to perform lookups in multiple data sources for data associated with consumer 114. For example, AR computing device 120 may use the registration consumer identifier included in the registration consumer data to perform a look up in social network computing device 160 for data associated with consumer 114, such as consumer 114 social network page which may include data corresponding to the number of friends and/or followers within the social network associated with social network computing device 160.

AR computing device 120 is further configured to collect and receive data associated with consumer 114 from the multiple data sources. Once AR computing device 120 receives the data from the multiple data sources, AR computing device 120 is configured to store the received data in tables within database 135 (as described in more in detail in FIG. 3) and generate, based on the stored data, an AR-based profile for consumer 114. In the example embodiment, AR computing device 120 generates the AR-based profile and continuously updates the profile by parsing the multiple data sources, collecting, from the multiple data sources, updated data associated with consumer 114, and updating the tables within database 135.

In the example embodiment, when a registered consumer 114 in the CP service visits a merchant (e.g., a physical location of the merchant) using the CP service, user 104 (e.g., an employee of the merchant equipped with AR display device 110 or otherwise holding AR display device 110) may view consumer 114 through AR display device 110, which may detect consumer 114 as a registered or non-registered consumer. The detection may include AR display device 110 establishing a connection link with a registered consumer computing device 180, and retrieving a consumer computing device identifier so that AR computing device 120 may perform a look up to retrieve the AR-based profile associated with the consumer computing device identifier.

In some embodiments, user 104 may be any individual who utilizes AR display device 110. Upon detection of consumer 114 as a registered consumer, AR display device 110 may receive from AR computing device 120 AR data associated with consumer 114 along with instructions to display the AR data on AR display device 110. AR display device 110 is configured to display the AR data to user 114 as an overlay over the natural surroundings of user 114. Thus, user 114 is able to see the AR data being displayed while still viewing consumers, aisles, shelves, and other items included within the user's 114 surroundings along with the movement of all such items. AR display device 110 is also configured to display the AR data by superimposing such data either on top, above, or near the consumer on the see-through display. AR display device 110 is further configured to display the AR data in the form of CG elements. The AR data may include consumer spend history data, consumer product return data, public record data, social network data, customer service data, hot zone data, online cart shopping data, image data, or any other data that may be suitable to be displayed on the see-through display of AR display device 110. In some embodiments, the AR data may also include real-time data transmitted from AR computing device 120, a server, user input data, and/or data stored in AR system 100.

In some embodiments, AR system 100 may include other computing devices and/or systems in communication with AR display device 110, either directly or indirectly, via merchant computing device 150 and/or AR computing device 120. AR display device 110 may be in communication with computing devices and/or systems via network connections, such as the Internet, LAN/WAN, BLUETOOTH™, Wi-Fi, or other connections capable of transmitting data across computing devices. Such computing devices and/or systems may include a point-of-sale (POS) system, a security system, an entertainment system, or any other suitable devices that enable AR system 100 to function as described herein. AR display device 110 may also be in communication with other systems, directly or indirectly, via merchant computing device 150 and/or AR computing device 120, such systems may be public record computing devices 170, social network computing devices 160, or any other suitable devices that enable AR system 100 to function as described herein. AR display device 110 may also be in communication with consumer computing device 180 via the network connections described above. These network connections enable AR display device 110 to detect consumer computing device 180 located at a predefined distance from AR display device 110. Once AR display device 110 detects consumer computing device 180, AR display device 110 establishes a connection or link with consumer computing device 180 and transmits an electronic message (e.g., ping) to an electronic computer application stored on consumer computing device 180, where the electronic computer application is associated with the CP service. The message includes a request to confirm that consumer computing device 180, and more specifically consumer 114, is registered in the CP service. If the electronic computer application stored on consumer computing device 180 returns to AR display device 110 an electronic message including a confirmation of registration and data associated with consumer 114 (e.g., AR consumer data), AR display device 110 transmits the data associated with consumer 114 to AR computing device 120, which in response transmits the AR data associated with consumer 114 to AR display device 110 for user 104 to view in form of, for example, CG elements.

In the example embodiment, AR display device 110 includes a see-through, near-eye, mixed reality display device (e.g., HOLOLENS™ by Microsoft, GLASS™ by Google). AR display device 110 may be a pair of goggles, a pair of glasses, one or more contact lenses, a handheld device or screen, a fixed screen (such as a vehicle windshield or other surface), or the like. More generally, AR display device 110 may be any screen or screen that user 104 may look at to see user's 104 physical environment but that also enables user 104 to view certain CG elements superimposed onto the user's 104 view of the physical environment. These CG elements may appear two-dimensional or three-dimensional. As an example, the CG elements may be a three-dimensional (3D) rendering. In the example embodiment, AR computing device 120 generates these CG elements and transmits them to AR display device 110 for user 104 to view. AR display device 110 may also include embedded or communicatively coupled input/output devices to enable user 104 to interact with AR display device 110. For example, AR display device 110 may have a camera device embedded or attached, enabling AR display device 110 to capture and record images directly. The camera device may also enable infrared technology to detect (e.g., recognize) consumer 114. As another example, AR display device 110 may also include a microphone to receive voice commands, a speaker to transmit audio outputs, or the like. In a related embodiment, AR display device 110 may also be AR computing device 120. That is, AR display device 110 may generate some or all CG elements itself as well and/or the AR-based profiles.

In some embodiments, AR display device 110 is configured to receive data from user 104 of AR display device 110 via user computing device 112, a POS device (not shown), and/or user eye movement, hand gestures (e.g., tapping swiping, or input commands for AR display device 110 that are virtually displayed by AR display device 110), or other input modes detected by AR display device 110. In one embodiment, user computing device 112 is used by user 104 (e.g., a merchant employee) equipped with AR display device 110. User 104 may input data, such as user input data, into user computing device 112 which transmits the user input data to AR display device 110. AR display device 110 may transmit the user input data to AR computing device 120, directly or indirectly, via merchant computing device 150. AR computing device 120 may store the user input data within database 135. Additionally or alternatively, merchant computing device 150 and/or AR computing device 120 may be configured to transmit the user input data to other AR display devices 110 in communication with merchant computing device 150 and/or AR computing device 120, so that these AR display devices 110 may display a CG element in the form of an icon (e.g., flag, geometric shape, or the like) indicating, for example, that consumer 114 has already been helped. The user input data may include whether customer support was provided to the consumer, the type of customer support provided to the consumer (e.g., the inquiry of the consumer and answer of the retail employee to the consumer inquiry), the satisfaction of the consumer with the customer support, or the like. In the example embodiment, user computing device 112, merchant computing device 150, and consumer computing device 180 may include a web-enabled phone (e.g., a "smartphone"), a personal digital assistant (PDA), a desktop computer, a laptop computer, a cellular phone, a tablet, a phablet, or other web-based connectable equipment the user (e.g., consumer 114, user 104, and/or other user of these computing devices) may use to communicate with AR display device 110.

In the example embodiment, AR computing device 120 is configured to cause AR display device 110 to move the CG elements associated with consumer 114 as consumer 114 moves through the merchant location (e.g., merchant store) so that the CG elements stay linked or connected to the corresponding consumer 114 on the screen of AR display device 110. Specifically, AR computing device is configured to cause AR display device 110 to display certain CG elements as icons as described above. AR display device 110 may be configured to superimpose the icons either on top, above, or near the registered consumer 114 on the see-through display. The CG elements are virtually linked to registered consumer 114 such that as registered consumer 114 moves within the see-through display, the CG elements move with consumer 114, where the CG elements are configured to be user-interactive such that the CG elements may be selected by user 104 to display on AR display device 110. AR computing device 120 is also configured to cause AR display device 110 to update the CG elements being displayed on AR display device 110. For example, if consumer 114 has been helped by a first user 104, first user 104 may input user input data into a first AR display device 110 indicating that consumer 114 has been helped. In some embodiments, the first AR display device 110 transmits the user input data to AR computing device 120. Once AR computing device 120 receives the user input data, AR computing device 120 updates in real time the AR data included in the AR-based profile of consumer 114 such that when a second AR display device 110 requests the AR-based profile associated with consumer 114 (e.g., second AR display device 110 is linked or connected to consumer computing device 180 associated with consumer 114), second AR display device 110 is configured to receive from AR computing device 120 the updated AR data, and display on the see-through display of second AR display device 110 the updated AR data (e.g., an updated icon indicating that consumer 114 has been helped, consumer 114 just returned one or more items, consumer 114 just purchased one or more items, or the like) to a second user 104 associated with second AR display device 110.

In some embodiments, AR display device 110 is configured to record and analyze verbal interactions. AR display device 110 is further configured to determine the type of verbal interaction that was recorded and automatically transmit the recorded verbal interaction to AR computing device 120, directly or indirectly, via merchant computing device 150. Merchant computing device 150 and/or AR computing device 120 may transmit the recorded verbal interaction to another AR display device 110 (e.g., an AR display device used by a manager of the merchant employee). For example, user 104, such as an employee, may have a conversation with consumer 114. During the conversation, AR display device 110 may record and analyze the conversation. By performing an analysis of the conversation, AR display device 110 may determine that the conversation involves a consumer complaint and, based on such determination, automatically transmits the conversation, in the form of a message, directly to a manager's AR display device 110. This could also be done via merchant computing device 150 and/or AR computing device 120.

In yet other embodiments, AR computing device 120 is configured to receive and store recordings, such as videos and/or audios, captured by AR display device 110. The recordings may include interactions between user 104 equipped with AR display device 110 and one or more consumers 114. The recordings may also include interactions between user 104 equipped with AR display device 110 and any other person that user 104 may interact with (e.g., other employees, managers, or the like). The stored recordings may be used for later review. For example, the recordings may be used for training, service improvement, potential payment dispute settlements (e.g., consumers and/or suppliers payment dispute settlements), or any other suitable use the users of AR computing device 120 may find.

Figure 2:
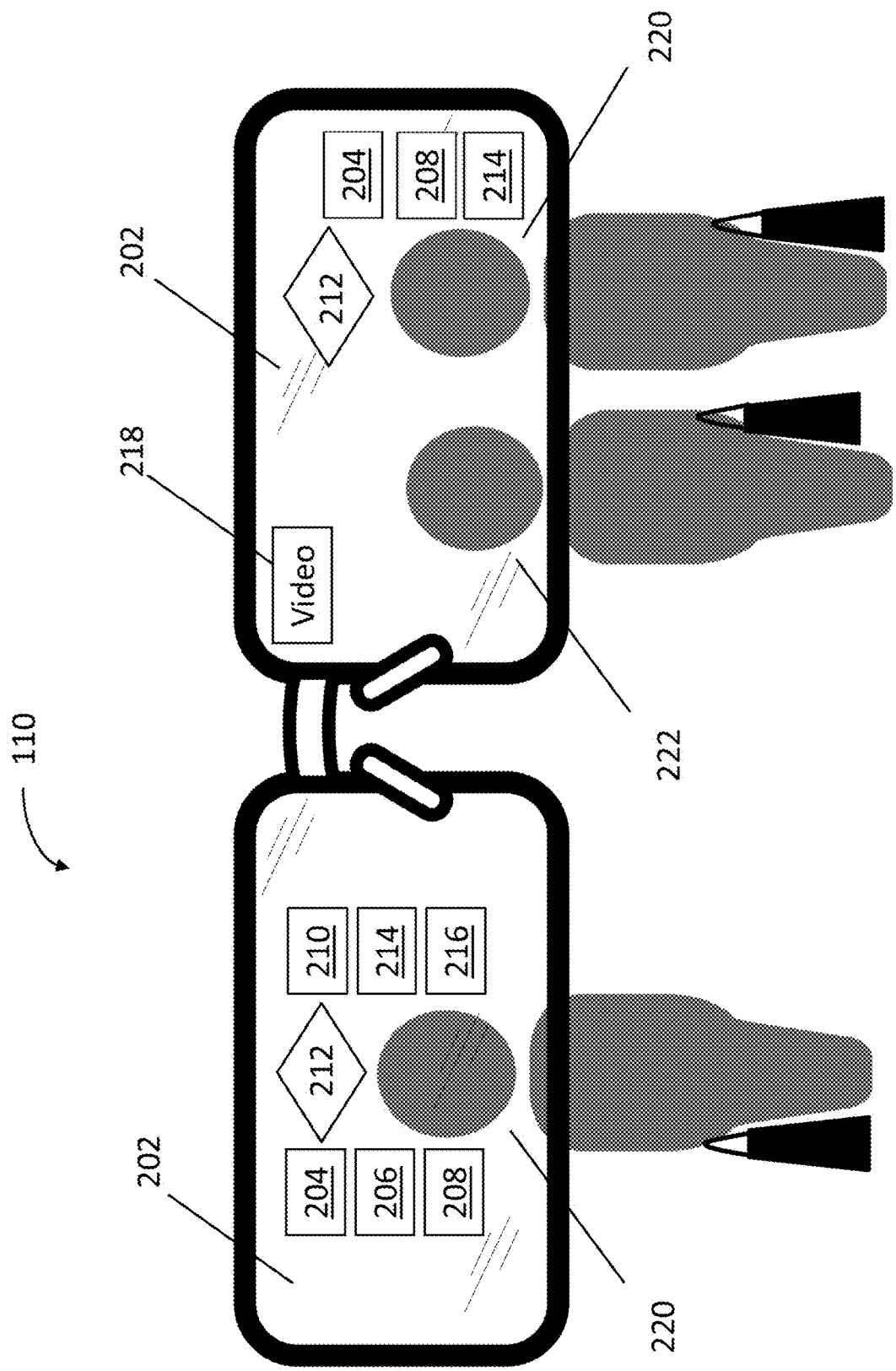

FIG. 2 is an exemplary display of AR-based profiles using AR display device 110. AR display device 110 is configured to display augmented reality (AR) data 210 to user 104 (shown in FIG. 1) as an overlay over the natural surroundings of user 104. Thus, user 104 is able to see AR data 210 while still viewing registered consumers 220 (similar to consumers 114 illustrated in FIG. 1), non-registered consumers 222, tables, chairs, and other items included within user's 104 surroundings along with the movement of all such items. AR display device 110 is configured to display AR data 210 to user 104 while user 104 is still able to see the real-environment where user 104 is located. In certain embodiments, AR display device 110 is configured to display AR data 210 to user 104 using computer-generated (CG) elements. AR display device 110 displays AR data 210 by superimposing AR data 210 either on top, above, or near of registered consumers 220 on see-through display 202. AR data 210 may include consumer spend history data 204, consumer product return data 206, public record data 208, social network data 210, hot zone data 212, customer service data 214, online cart shopping data 218, image data 220, or any other data that may be suitable to be displayed on the see-through display 202 of AR display device 110.

In some embodiments, AR display device 110 displays consumer spend history data 204 to user 104. User 104 may be a merchant employee equipped with AR display device 110. Consumer spend history data 204 may include a description of items registered consumer 220 has bought at the merchant and/or other merchants, an amount spent by registered consumer 220 for each item bought and/or a total amount spent for a period of time, time when items were bought by registered consumer 220, a quantity of items bought by registered consumer 220, a historical spend pattern (e.g., historical pattern corresponding to types of items bought by registered consumer 220, currency amount (s) spent by registered consumer 220, dates and times when registered consumer 220 purchased the items, and other historical spend data that may have a pattern), and other types of consumer spend history data associated with purchases performed by registered consumer 220. In other embodiments, AR display device 110 displays consumer product return data 206 to user 104. Consumer product return data 214 may include a product return ratio, a description of returned items by registered consumer 220, an amount of items returned by registered consumer 220, a pattern of types of items returned by registered consumer 220, day/time when items were returned by the registered consumer 220, a historical pattern of items returned by registered consumer 220 (e.g., historical pattern corresponding to types of items retuned by registered consumer 220, current amount(s) returned by registered consumer 220, dates and times when registered consumer 220 returned the items, and other historical product return data that may have a pattern), and other types of consumer product return data associated with purchases performed by registered consumer 220. In yet other embodiments, AR display device 110 displays public record data 208 to user 104. Public record data 208 may include an individual identifier, a type of offense, a time and date of offense, place of offense, and/or other associated with public record. In other embodiments, AR display device 110 is configured to display social network data 210 to user 104. Social network data 210 may include a social network identifier, a social network name (e.g., FACEBOOK®, INSTAGRAM®, SNAPCHAT®, or other social network names), a user identifier, a user name, a number of followers and/or friends associated with each social network, liked pages, marketplace data, and/or other social network data associated with registered consumer 220 social network interaction.

In some other embodiments, AR display device 110 is configured to display hot zone data 212 to user 104. Hot zone data 212 may include one or more CG elements in the form of icons (e.g., flag, geometric shape, or the like) indicating that registered consumer 220 is moving towards or is in an area of the merchant's location where registered consumer 220 has purchased items before (e.g., a clothing section, shoes section, hardware section, or the like). In yet other embodiments, AR display device 110 is configured to display customer service data 214 to user 104. Customer service data 214 may include a flag that indicates whether registered consumer 220 has been helped, historical customer support data (e.g., how many times registered consumer 220 has been help, dates and times registered consumer 220 was helped, registered consumer 220 inquiries each time he or she was helped, answers to registered consumer 220 inquiries, satisfaction of registered consumer 220 for each time he or she was helped, registered consumer 220 satisfaction pattern, whether each consumer inquiry was resolved, and other historical customer support data associated with events when the consumer was helped), sales conversion rates when registered consumer 220 was helped, and other customer service data associated with the customer service provided to registered consumer 220. In some embodiments, AR display device 110 is configured to display online cart shopping data 216 to user 104. Online cart shopping data 216 may include items and their quantities placed by registered consumer 220 in an online shopping cart of the merchant that registered consumer 220 is physically now visiting. In other embodiments, AR display device 110 is configured to display image data 218 to user 104. For example, AR display device 110 may be in communication with a security system via AR computing device 120 and/or merchant computing device 150 (both shown in FIG. 1). The security system captures a video of a location that user 104 is interested in seeing (e.g., an aisle section of merchant store) and transmits the video to AR computing device 120 and/or merchant computing device 150. AR computing device 120 and/or merchant computing device 150 transmit the video to AR display device 110, which receives the video and displays it using see-through display 202 to user 104.

In the example embodiment, AR display device 110 is configured to place the CG elements in positions within see-through display 202 that enable user 104 to identify that these CG elements correspond to a registered consumer 220 and not to a non-registered consumer 222. Therefore, AR display device 110 does not superimpose AR data 210 either on top, above, or near of non-registered consumers 222 on see-through display 202. However, infrared technology embedded in AR display device 110, for example, may detect non-registered consumers 222 and corresponding consumer computing devices 180 (e.g., mobiles devices), as illustrated in FIG. 1. Once AR display device 110 has detected non-registered consumers 222 and corresponding non-registered consumer computing devices 180, AR display device 110 may transmit a message to said computing devices using a similar method that AR display device 110 uses to transmit messages to consumer computing device 180. The message sent to non-registered consumer computing devices 180 may include a merchant identifier and addendum data. The addendum data may include information related to the merchant, such as incentives (e.g., discounts) for the consumer to download an application associated with the merchant and the CP service. Thus, the non-registered consumers can even more easily become registered consumers.

Figure 3:
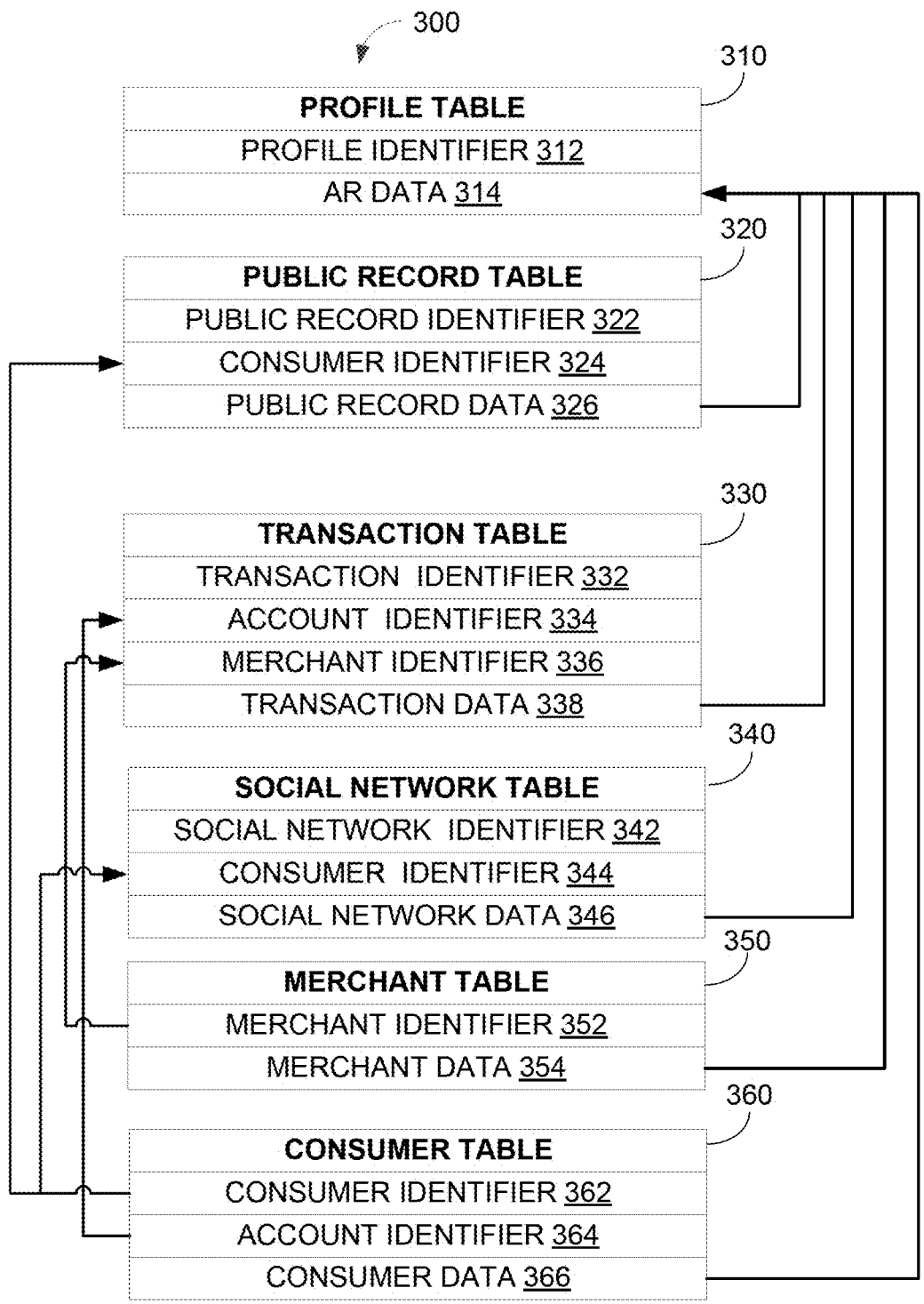

FIG. 3 depicts an example configuration of a database 300 (similar to database 135 illustrated in FIG. 1) included in AR system 100 (shown in FIG. 1). Database 135 includes, at least, profile table 310, public record table 320, transaction table 330, social network table 340, merchant table 340, merchant table 350, and consumer table 360. Profile records in profile table 310 are uniquely identified by a profile identifier 312. Public record records in public record table 320 are uniquely identified by a public record identifier 322. Transaction records in transaction table 330 are uniquely identified by a transaction identifier 332. Social network records in social network table 340 are uniquely identified by a social network identifier 342. Merchant records in merchant table 350 are uniquely identified by merchant identifier 352. Consumer records in consumer table 360 are uniquely identified by consumer identifier 362.

AR computing device 120 is configured to generate profile records, and more specifically AR-based profiles in the form of AR data 314, and profile identifier 312 in profile table 330 based on stored data in tables of database 300. In particular, AR computing device 110 generates AR-based profiles based on public data 326, transaction data 338, social network data 346, merchant data, 354, and consumer data 366 (e.g., registration consumer data and/or AR consumer data). In the example embodiment, AR computing device 120 is configured to store AR data 314 and corresponding profile identifier 312 in profile table 310.

AR computing device 120 is also configured to generate public records, including public record identifier 322, in public record table 320 based on public record data 326. Additionally or alternatively, AR computing device 120 is configured to determine public record identifier 322 based on public data 326 associated with consumer identifier 326 (e.g., registration consumer identifier and/or AR consumer identifier). In the example embodiment, AR computing device 120 is configured to store public record data 326, corresponding public record identifier 322, and consumer identifier 324 as records in public record table 320.

AR computing device 120 is also configured to generate transaction records, including transaction identifier 332, in transaction table 330 based on transaction data 338, account identifier 334, and merchant identifier 336. Additionally or alternatively, AR computing device 120 is configured to determine transaction identifier 332 based on transaction data 338 associated with account identifier 334. In the example embodiment, AR computing device 120 is configured to store transaction data 338, corresponding transaction identifier 332, account identifier 334, and merchant identifier 336 as records in transaction table 330.

AR computing device 120 is further configured to generate social network records, including social network identifier 342, in social network table 340 based on social network data 346 and consumer identifier 344. Additionally or alternatively, AR computing device 120 is configured to determine social network identifier 342 based on social network data 346 associated with consumer identifier 344. In the example embodiment, AR computing device 120 is configured to store social network data 346, corresponding social network identifier 342, and consumer identifier 344 as records in social network table 340.

AR computing device 120 is also configured to generate merchant records, including merchant identifier 352, in merchant table 350 based on merchant data 356. Additionally or alternatively, AR computing device 120 is configured to determine merchant identifier 352 based on merchant data 354. In the example embodiment, AR computing device 120 is configured to store merchant data 354, and corresponding merchant identifier 352 as records in social network table 350.

AR computing device 120 is further configured to generate consumer records, including consumer identifier 362, in consumer table 360 based on consumer data 366 and account identifier 364. Additionally or alternatively, AR computing device 120 is configured to determine consumer identifier 362 based on consumer data 366 associated with account identifier 364. In the example embodiment, AR computing device 120 is configured to store consumer data 366, corresponding consumer identifier 362, and account identifier 364 as records in consumer table 360.

Database 135 is configured to receive queries, and generate query responses. In some embodiments, queries include any combination of profile identifier 312, public record identifier 322, transaction identifier 332, social network identifier 342, merchant identifier 352, and consumer identifier 362. Additionally or alternatively, queries may include ranges and/or rules for selecting identifiers. Database 135 is configured to filter profile records (e.g., AR data 314) based on the query, and generate a query response including the filtered data. For example, database 135 may generate a query response including AR data 346 corresponding to a particular consumer 114 (show in FIG. 1) associated with consumer identifier 362 included in the query.

In certain embodiments, AR computing device 120 is configured to store video data (similar to image data 218 as illustrated in FIG. 2) and/or video metadata as profile addendum data of the profile records. In one embodiment, AR data 314 includes video data and video metadata associated with an interaction between consumer 114 and user 104 (shown in FIG. 1). For example, AR computing device 120 may determine a consumer identifier associated with consumer 114, and may further store the video data as profile addendum data including the consumer identifier. Video data includes visual media in a machine readable format, such as MPEG4, WEBM, and the like. Video metadata includes, in one embodiment, a merchant identifier including video timestamp indicating a location within the associated video, a consumer identifier associated with the merchant identifier.

Figure 4:
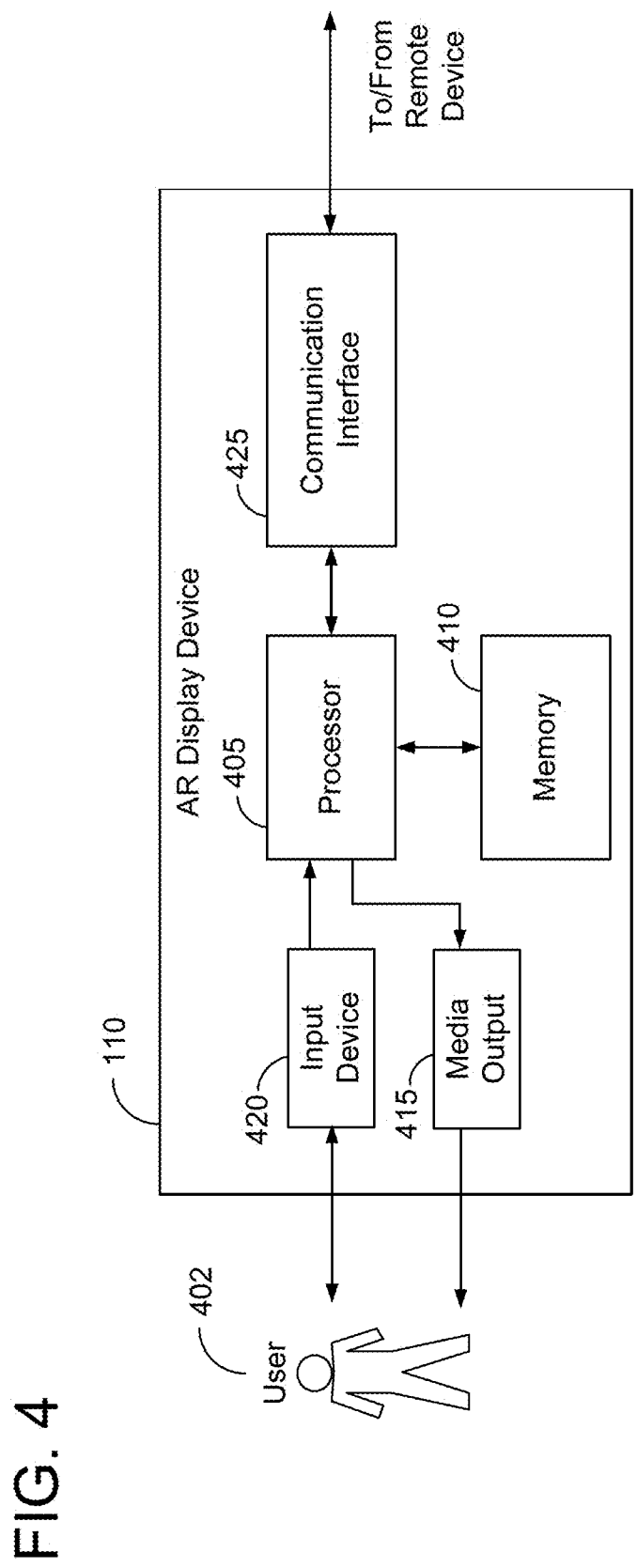

FIG. 4 illustrates an example configuration of an AR display device 110 (shown in FIG. 1) configured to display AR data, such as CG elements. In the example embodiment, AR display device 110 includes a processor 405 for executing instructions. In some embodiments, executable instructions are stored in a memory 410. Processor 405 may include one or more processing units, for example, a multi-core configuration. Memory 410 is any device allowing information such as executable instructions and/or written works to be stored and retrieved. Memory 410 may include one or more computer readable media.

AR display device 110 also includes at least one media output component 415 for presenting information to user 402. User 402 may include, but is not limited to, user 104. Media output component 415 is any component capable of conveying information to user 402. For example, media output component 415 may be a display component, such as see-through display 302 (shown in FIG. 3), configured to display component lifecycle data in the form of CG elements. In some embodiments, media output component 415 includes an output adapter such as a video adapter and/or an audio adapter. An output adapter is operatively coupled to processor 405 and operatively connectable to an output device such as a display device, a liquid crystal display (LCD), organic light emitting diode (OLED) display, or "electronic ink" display, or an audio output device, a speaker or headphones.

In some embodiments, AR display device 110 includes an input device 420 for receiving input from user 402. Input device 420 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, a hand gesture reader/scanner, or the like. A single component, such as a touch screen, may function as both an output device of media output component 415 and input device 420. A single component such as a touch screen may function as both an output device of media output component 415 and input device 420. AR display device 110 may also include a communication interface 425, which is communicatively connectable to a remote device such as AR computing device 120 (shown in FIG. 1). Communication interface 425 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 410 are, for example, computer readable instructions for providing a user interface to user 402 via media output component 415 and, optionally, receiving and processing input from input device 420. A user interface may include, among other possibilities, a web browser and client application. Web browsers enable users, such as user 402, to display and interact with media and other information typically embedded on a web page or a website from AR computing device 120. A client application allows user 402 to interact with an AR computing device application from AR computing device 120.

Figure 5:
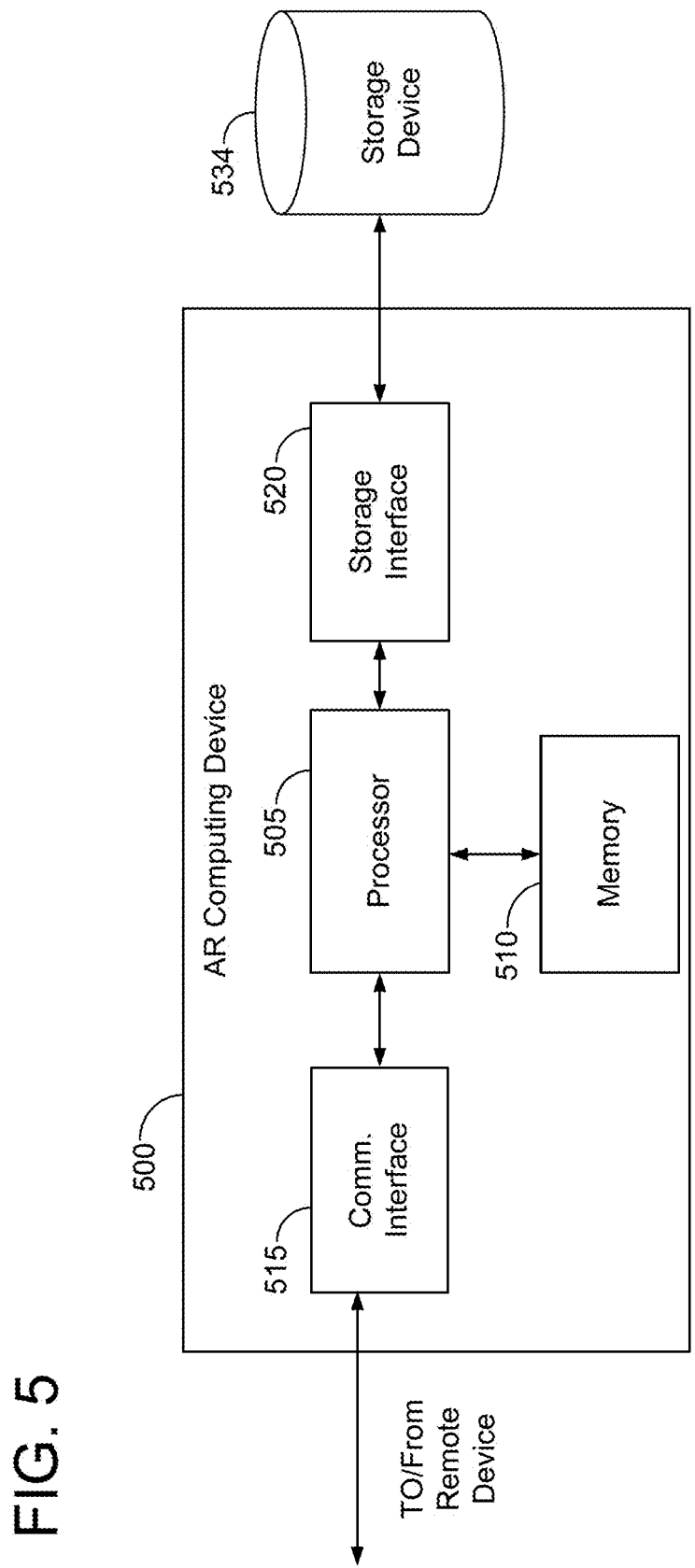

FIG. 5 illustrates an example configuration of an AR computing device 500, such as AR computing device 120 (shown in FIG. 1). AR computing device 500 may include, but is not limited to, database server 130 (shown in FIG. 1). In some embodiments, AR computing device 500 is similar to AR computing device 120.

AR computing device 500 includes a processor 505 for executing instructions. Instructions may be stored in a memory 510, for example. Processor 505 may include one or more processing units (e.g., in a multi-core configuration) for executing instructions. The instructions may be executed within a variety of different operating systems on the AR computing device 500, such as UNIX, LINUX, Microsoft Windows®, etc. More specifically, the instructions may cause various data manipulations on data stored in storage device 534 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 505 is operatively coupled to a communication interface 515 such that service provider AR computing device 500 is capable of communicating with a remote device, such as a user system or another AR computing device 500. For example, communication interface 515 may receive communications from payment processor computing device 140 via the Internet, as illustrated in FIG. 1.

Processor 505 may also be operatively coupled to a storage device 534. Storage device 534 is any computer-operated hardware suitable for storing and/or retrieving data. In some embodiments, storage device 534 is integrated in AR computing device 500. In other embodiments, storage device 534 is external to service provider AR computing device 500 and is similar to database server 130 (shown in FIG. 1). For example, AR computing device 500 may include one or more hard disk drives as storage device 534. In other embodiments, storage device 534 is external to AR computing device 500 and may be accessed by a plurality of AR computing device 500. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory 510 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
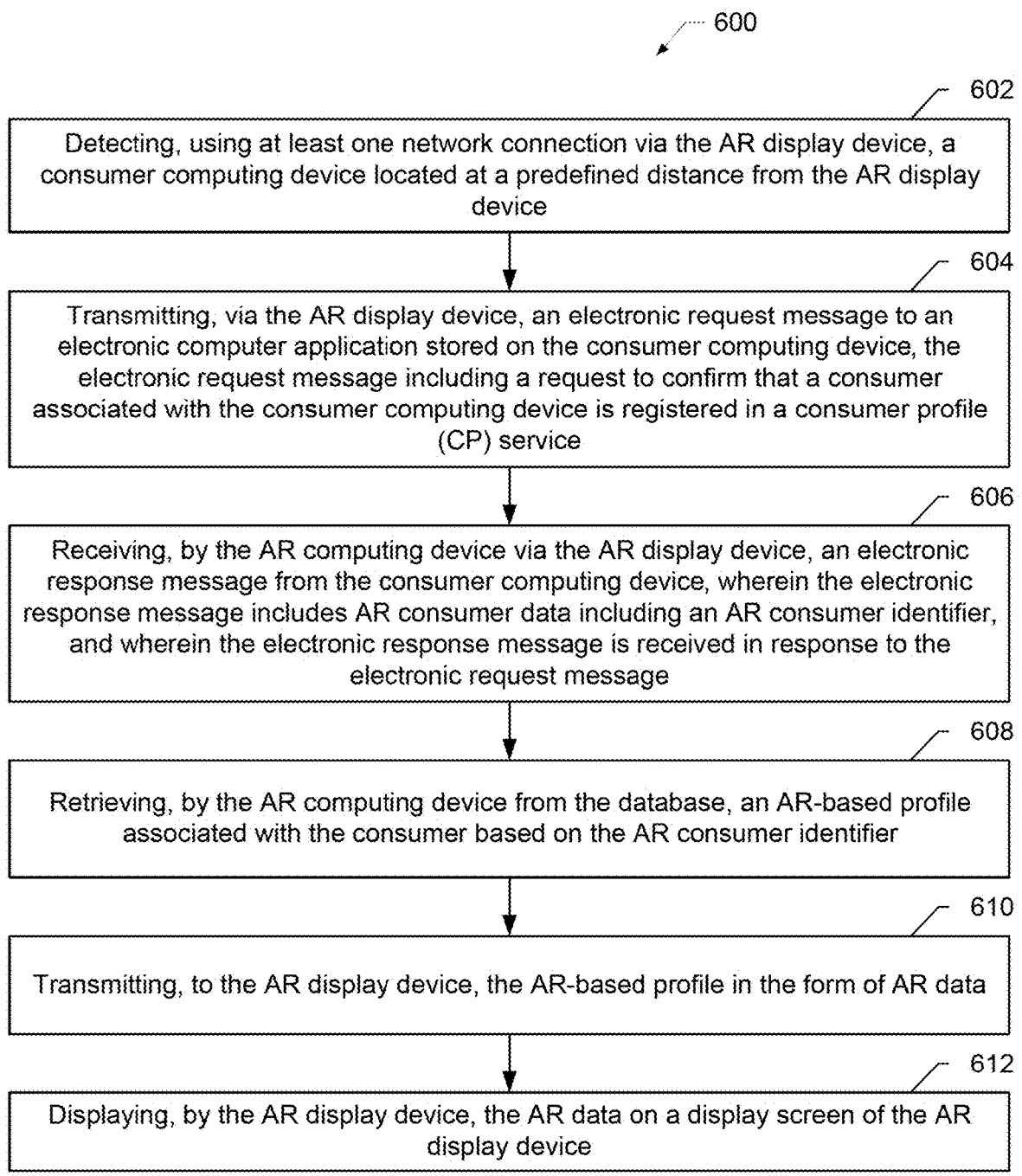

FIG. 6 is an example flow diagram illustrating a method flow 600 by which AR system 100 (shown in FIG. 1) generates AR-based profiles using AR computing device 120 and AR display device 110 (both shown in FIG. 1) operated by user 104 (shown in FIG. 1). Method 600 includes detecting 602, using at least one network connection via AR display device 110, consumer computing device 180 (shown in FIG. 1) located at a predefined distance from AR display device 110. Method 600 also includes transmitting 604, via AR display device 110, an electronic request message to an electronic computer application stored on consumer computing device 180, the electronic request message including a request to confirm that consumer 104 (shown in FIG. 1) associated with consumer computing device 180 is registered in a consumer profile (CP) service. Method 600 further includes receiving 606, by AR computing device 120 via AR display device 110, an electronic response message from consumer computing device 180, wherein the electronic response message includes AR consumer data including an AR consumer identifier, and wherein the electronic response message is received in response to the electronic request message. Method 600 also includes retrieving 608, by AR computing device 120 from database 135, an AR-based profile associated with consumer 104 based on the AR consumer identifier, transmitting 610, to AR display device 110, the AR-based profile in the form of AR data 314 (shown in FIG. 3), and displaying 612, by AR display device 110, AR data 314 on a display screen of AR display device 110.

Figure 7:
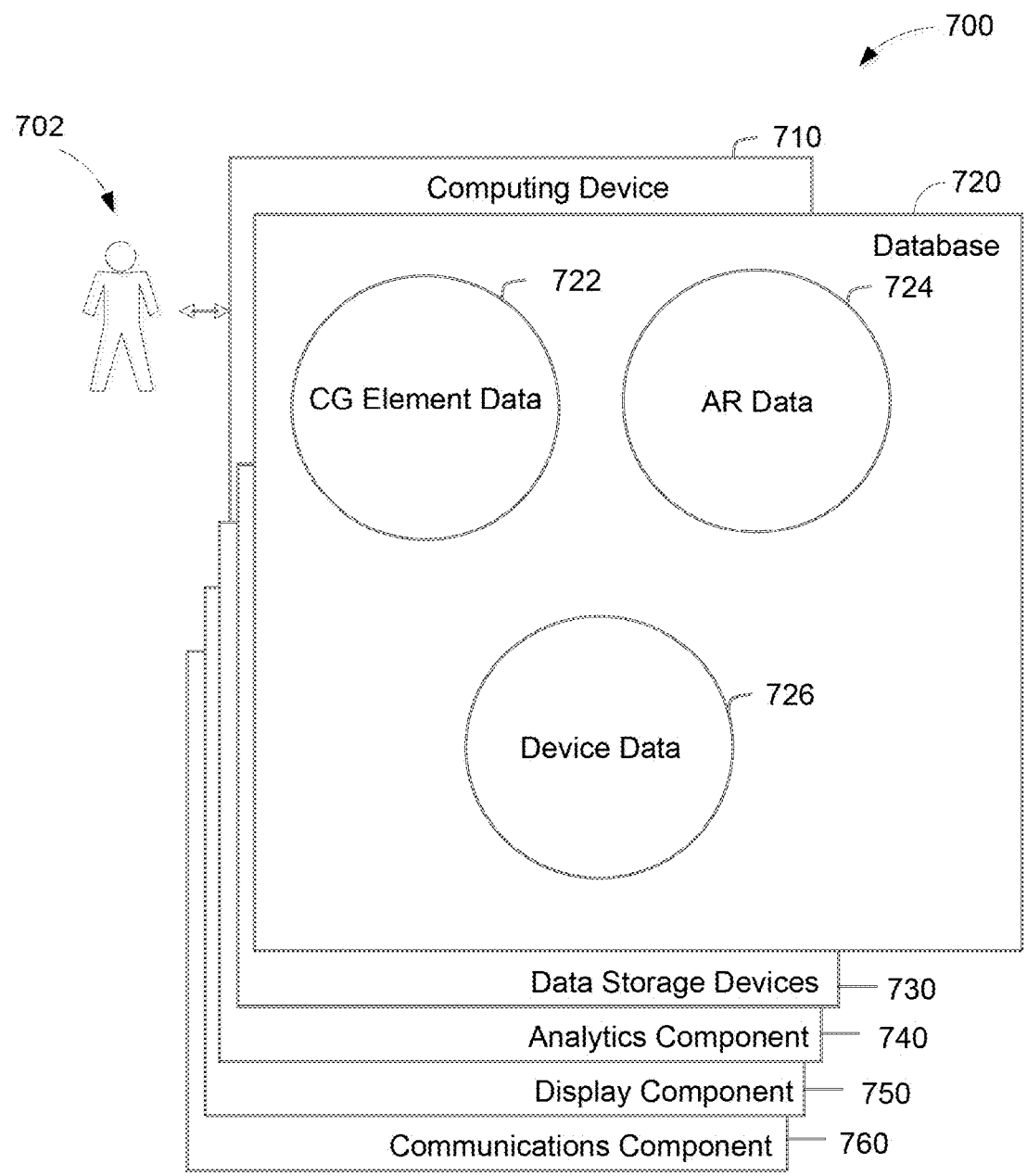

FIG. 7 shows an example configuration of a database 700 within computing device 710, along with other related computer components, that may be used to generate AR-based profiles and display CG elements using AR data 314 (shown in FIG. 3). In the example embodiment, computing device 710 is similar to AR computing device 120 (shown in FIG. 1). Operator 702 (such as a user 104 operating AR computing device 120, as illustrated in FIG. 1) may access computing device 710 in order to manage CP service delivery for one or more other users 104 (such as the users inputting and/or viewing CG element data using AR display device 110, as illustrated in FIG. 1). In some embodiments, database 720 is similar to database 135 (shown in FIG. 1). In the example embodiment, database 720 includes CG element data 722, AR data 724, and device data 726. CG element data 722 includes data relating to current and prior computer-generated elements (e.g., recorded images of CG elements, resolutions, pixel values, color values, size values, associations with specific users, or the like). AR data 724 includes data regarding consumers registered with the CP service, such as registered consumers 114 (shown in FIG. 1). AR data 724 may include consumer spend history data, consumer product return data, public record data, social network data, customer service data, hot zone data, online cart shopping data, and image data. Device data 726 includes data relating to devices in communication with computing device 710 (such as devices in communication with AR computing device 120). Such devices may include AR display device 110, user computing device 112, payment processor computing device 140, merchant computing device 150, social network computing device 160, public record computing device 170, consumer computing device 180 (all show in in FIG. 1), or any other device in communication with computing device 710.

Computing device 710 also includes data storage devices 730. Computing device 710 further includes analytics component 740 that assists in generating CG elements. Computing device 710 also includes display component 750 that may be used by operator 702 to view the status of computing device 710. Computing device 710 also includes communications component 770 which is used to communicate with remote computer devices communicatively coupled to computing device 710, as described above. In one embodiment, communications component 770 is similar to communications interface driver 515 (shown in FIG. 5).

As will be appreciated based on the foregoing specification, the above-described embodiments of the disclosure may be implemented using computer programming or engineering techniques including computer software, firmware, hardware or any combination or subset thereof, wherein the technical effect is to display CG elements to a user to improve customer service while performing a service activity, enhancing the customer service awareness of a retail staff, such as a wait staff, and consequently providing a more seamless dining experience for consumers. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An augmented reality (AR) system for generating AR-based profiles using an AR computing device and an AR display device controlled by a merchant, the AR computing device being communicatively coupled to the AR display device, a camera device, and a database, the AR system configured to:
receive, by the AR computing device from a payment processor computing device, transaction data corresponding to a plurality of payment transactions between a consumer and a plurality of merchants, the transaction data associated with a payment processing network and including, for each of the payment transactions, consumer account data corresponding to one of a plurality of consumers, a merchant ID corresponding to one of a plurality of merchants and data descriptive of a corresponding purchase;
generate, by the AR computing device using the transaction data for a consumer registered for a consumer profile (CP) service, an AR-based profile including information of the consumer comprising historical spend data associated with the consumer;
detect, using at least one network connection via the AR display device, a consumer computing device located at a predefined distance from the AR display device, the consumer computing device associated with a consumer;
transmit, via the AR display device, an electronic request message to an electronic computer application stored on the consumer computing device, the electronic request message including a request to confirm that the consumer associated with the consumer computing device is registered in the consumer profile (CP) service;
receive, by the AR computing device via the AR display device, an electronic response message from the consumer computing device, wherein the electronic response message includes AR consumer data including an AR consumer identifier and confirmation of registration of the consumer in the CP service, and wherein the electronic response message is received in response to the electronic request message;

in response to receiving the confirmation that the consumer is registered in the CP service, retrieve, by the AR computing device from the database, the AR-based profile associated with the consumer based on the AR consumer identifier;

transmit, by the AR computing device to the AR display device, the AR-based profile in the form of AR data; and display, on the AR display device, the AR data on a see-through display screen of the AR display device, the AR data being superimposed near the consumer in response to the consumer being visible in a field of view of the see-through display screen to a representative of the merchant, the AR data displaying i) the information of the consumer to the representative of the merchant, and ii) hot zone data generated from the historical spend data, wherein the displayed hot zone data includes one or more computer-generated (CG) elements comprising at least one icon, the at least one icon displayed to the representative of the merchant in response to the consumer moving towards, or being in, an area within a location of the merchant, the area associated with at least one item that the consumer has purchased before.

2. The AR system of claim 1 further configured to:
receive, by the AR computing device, an electronic registration message from the consumer computing device, wherein the electronic registration message includes registration consumer data, wherein the registration consumer data includes a registration consumer identifier associated with the consumer; and
store, by the AR computing device, the registration consumer data within the database.

3. The AR system of claim 2 further configured to:
receive, by the AR computing device, the registration consumer data;
match, by the AR computing device, the registration consumer identifier to the AR consumer identifier; and
identify, by the AR computing device, the AR-based profile based on the matching.

4. The AR system of claim 2 further configured to:
perform a look up, by the AR computing device within multiple data sources, for data associated with the registration consumer identifier;
collect, by the AR computing device from the multiple data sources, the data associated with the registration consumer identifier;
store, by the AR computing device, the collected data within the database; and
generate, by the AR computing device based on the stored data, the AR-based profile for the consumer.

5. The AR system of claim 4, wherein the multiple data sources include at least one of the AR display device, a payment processor computing device, at least one public record computing device, at least one social network computing device associated with social networks, and at least one merchant computing device, at least one consumer computing device.

6. The AR system of claim 4 further configured to:
update the AR data by performing at least one of receiving, by the AR computing device via the AR display device, user input data, and parsing, by the AR computing device, the multiple data sources; and
display, on the AR display device, the AR data that has been updated, the updated AR data displayed as the CG elements in the form of an updated icon indicating that the consumer has been helped by at least one of the representative of the merchant and another representative of the merchant.

7. The AR system of claim 5, wherein the AR computing device is communicatively coupled to the payment processor computing device, and wherein the payment processor computing device is configured to transmit transaction data associated with the consumer to the AR computing device.

8. The AR system of claim 1, wherein the AR display device includes a see-through, near-eye, mixed reality display device.

9. The AR system of claim 1, wherein the AR display device is configured to display the AR data in the form of a plurality of computer-generated (CG) elements, wherein the AR display device is in communication with a security system associated with the merchant, wherein the security system captures a video including the area within the location of the merchant, and wherein the AR display device displays the video on the see-through display screen to the representative of the merchant.

10. The AR system of claim 1, wherein the AR data includes at least one of consumer spend history data, consumer product return data, public record data, social network data, customer service data, hot zone data, online cart shopping data, and image data.

11. A computer-implemented method for generating augmented reality (AR)-based profiles using an augmented reality (AR) system including an AR computing device and an AR display device controlled by a merchant, the AR computing device being communicatively coupled to the AR display device, a camera device, and a database, the method comprising:

receiving, by the AR computing device from a payment processor computing device, transaction data corresponding to a plurality of payment transactions between a consumer and a plurality of merchants, the transaction data associated with a payment processing network and including, for each of the payment transactions, consumer account data corresponding to one of a plurality of consumers, a merchant ID corresponding to one of a plurality of merchants and data descriptive of a corresponding purchase;

generating, by the AR computing device using the transaction data for a consumer registered for a consumer profile (CP) service, an AR-based profile including information of the consumer comprising historical spend data associated with the consumer;

detecting, using at least one network connection via the AR display device, a consumer computing device located at a predefined distance from the AR display device, the consumer computing device associated with a consumer;

transmitting, via the AR display device, an electronic request message to an electronic computer application stored on the consumer computing device, the electronic request message including a request to confirm that the consumer associated with the consumer computing device is registered in the consumer profile (CP) service;

receiving, by the AR computing device via the AR display device, an electronic response message from the consumer computing device, wherein the electronic response message includes AR consumer data including an AR consumer identifier and confirmation of registration of the consumer in the CP service, and wherein the electronic response message is received in response to the electronic request message;
in response to receiving the confirmation that the consumer is registered in the CP service, retrieving, by the AR computing device from the database, the AR-based profile associated with the consumer based on the AR consumer identifier;
transmitting, by the AR computing device to the AR display device, the AR-based profile in the form of AR data; and
causing to be displayed, on the AR display device, the AR data on a see-through display screen of the AR display device, the AR data being superimposed near the consumer in response to the consumer being visible in a field of view of the see-through display screen to a representative of the merchant, the AR data displaying i) the information of the consumer to the representative of the merchant, and ii) hot zone data generated from the historical spend data, wherein the displayed hot zone data includes one or more computer-generated (CG) elements comprising at least one icon, the at least one icon displayed to the representative of the merchant in response to the consumer moving towards, or being in, an area within a location of the merchant, the area associated with at least one item that the consumer has purchased before.

12. The method in accordance with claim 11 further comprising:
receiving, by the AR computing device, an electronic registration message from the consumer computing device, wherein the electronic registration message includes registration consumer data, wherein the registration consumer data includes a registration consumer identifier associated with the consumer; and
storing, by the AR computing device, the registration consumer data within the database.

13. The method in accordance with claim 12 further comprising:
receiving, by the AR computing device, the registration consumer data;
matching, by the AR computing device, the registration consumer identifier to the AR consumer identifier; and
identifying, by the AR computing device, the AR-based profile based on the matching.

14. The method in accordance with claim 12 further comprising:
performing a look up, by the AR computing device within multiple data sources, for data associated with the registration consumer identifier;
collecting, by the AR computing device from the multiple data sources, the data associated with the registration consumer identifier;
storing, by the AR computing device, the collected data within the database; and
generating, by the AR computing device based on the stored data, the AR-based profile for the consumer.

15. The method in accordance with claim 14, wherein the multiple data sources include at least one of the AR display device, a payment processor computing device, at least one public record computing device, at least one social network computing device associated with social networks, and at least one merchant computing device, at least one consumer computing device.

16. The method in accordance with claim 14 further comprising:
updating the AR data by performing at least one of receiving, by the AR computing device via the AR display device, user input data and parsing, by the AR computing device, the multiple data sources; and
displaying, on the AR display device, the AR data that has been updated, the updated AR data displayed as the CG elements in the form of an updated icon indicating that the consumer has been helped by at least one of the representative of the merchant and another representative of the merchant.

17. The method in accordance with claim 15, wherein the AR computing device is communicatively coupled to the payment processor computing device, and wherein the payment processor computing device is configured to transmit transaction data associated with the consumer to the AR computing device.

18. The method in accordance with claim 11, wherein the AR display device includes a see-through, near-eye, mixed reality display device.

19. The method in accordance with claim 11, wherein the AR display device is configured to display the AR data in the form of a plurality of computer-generated (CG) elements, wherein the AR display device is in communication with a security system associated with the merchant, wherein the security system captures including the area within the location of the merchant, and wherein the AR display device displays the video on the see-through display screen to the representative of the merchant.

20. The method in accordance with claim 11, wherein the AR data includes at least one of consumer spend history data, consumer product return data, public record data, social network data, customer service data, hot zone data, online cart shopping data, and image data.

21. A non-transitory computer readable medium that includes computer-executable instructions for generating augmented reality (AR)-based profiles using an augmented reality (AR) system including an AR computing device and an AR display device controlled by a merchant, the AR computing device being communicatively coupled to the AR display device, a camera device, and a database operated by a user, wherein when the computer-executable instructions are executed by the AR computing device, the computer-executable instructions cause the AR system to:
receive, by the AR computing device from a payment processor computing device, transaction data corresponding to a plurality of payment transactions between a consumer and a plurality of merchants, the transaction data associated with a payment processing network and including, for each of the payment transactions, consumer account data corresponding to one of a plurality of consumers, a merchant ID corresponding to one of a plurality of merchants and data descriptive of a corresponding purchase;
generate, by the AR computing device using the transaction data for a consumer registered for a consumer profile (CP) service, an AR-based profile including information of the consumer comprising historical spend data associated with the consumer;
detect, using at least one network connection via the AR display device, a consumer computing device located at a predefined distance from the AR display device, the consumer computing device associated with a consumer;
transmit, via the AR display device, an electronic request message to an electronic computer application stored on the consumer computing device, the electronic request message including a request to confirm that the consumer associated with the consumer computing device is registered in the consumer profile (CP) service;

receive, by the AR computing device via the AR display device, an electronic response message from the consumer computing device, wherein the electronic response message includes AR consumer data including an AR consumer identifier and confirmation of registration of the consumer in the CP service, and wherein the electronic response message is received in response to the electronic request message;

in response to receiving the confirmation that the consumer is registered in the CP service, retrieve, by the AR computing device from the database, the AR-based profile associated with the consumer based on the AR consumer identifier;

transmit, by the AR computing device to the AR display device, the AR-based profile in the form of AR data; and display, on the AR display device, the AR data on a see-through display screen of the AR display device, the AR data being superimposed near the consumer in response to the consumer being visible in a field of view of the see-through display screen to a representative of the merchant, the AR data displaying i) the information of the consumer to the representative of the merchant, and ii) hot zone data generated from the historical spend data, wherein the displayed hot zone data includes one or more computer-generated (CG) elements comprising at least one icon, the at least one icon displayed to the representative of the merchant in response to the consumer moving towards, or being in, an area within a location of the merchant, the area associated with at least one item that the consumer has purchased before.

22. The non-transitory computer readable medium in accordance with claim 21, wherein the computer-executable instructions further cause the AR system to:

receive, by the AR computing device, an electronic registration message from the consumer computing device, wherein the electronic registration message includes registration consumer data, wherein the registration consumer data includes a registration consumer identifier associated with the consumer; and store, by the AR computing device, the registration consumer data within the database.

23. The non-transitory computer readable medium in accordance with claim 22, wherein the computer-executable instructions further cause the AR system to:

receive, by the AR computing device, the registration consumer data;

match, by the AR computing device, the registration consumer identifier to the AR consumer identifier; and identify, by the AR computing device, the AR-based profile based on the matching.

24. The non-transitory computer readable medium in accordance with claim 22, wherein the computer-executable instructions further cause the AR system to:

perform a look up, by the AR computing device within multiple data sources, for data associated with the registration consumer identifier;

collect, by the AR computing device from the multiple data sources, the data associated with the registration consumer identifier;

store, by the AR computing device, the collected data within the database; and generate, by the AR computing device based on the stored data, the AR-based profile for the consumer.

25. The non-transitory computer readable medium in accordance with claim 24, wherein the computer-executable instructions further cause the AR system to:

receive, by the AR computing device via the AR display device, user input data; and parse, by the AR computing device, the multiple data sources.

* * * * *